C. WILKS.
CORN OR COTTON PLANTER.
APPLICATION FILED JULY 6, 1909.

958,204.

Patented May 17, 1910.

WITNESSES:
John S. Murray
Jessie Kirk

INVENTOR
Chance Wilks
BY John M. Spellman
ATTORNEY

UNITED STATES PATENT OFFICE.

CHANCE WILKS, OF LITTLE ELM, TEXAS.

CORN OR COTTON PLANTER.

958,204.     Specification of Letters Patent.     Patented May 17, 1910.

Application filed July 6, 1909. Serial No. 506,240.

*To all whom it may concern:*

Be it known that I, CHANCE WILKS, a citizen of the United States, residing at Little Elm, in the county of Denton and State of Texas, have invented certain new and useful Improvements in Corn or Cotton Planters, of which the following is a specification.

My invention relates to new and useful improvements in corn and cotton planters. Its object is to provide a farm implement, by the use of which, corn or cotton may be planted quickly and systematically, no other mechanism being employed than that carried by the machine itself.

A further object is to provide a machine for planting corn or cotton which will carry concave disks to replace the runners now used to prepare a furrow to hold the seed, and thereby lessen the draft of the planter.

Finally, the object of my invention is to provide a device of the character described, which will be strong, durable, simple and efficient and comparatively easy to produce; also one in which the various parts will not be likely to get out of working order.

Figure 1:
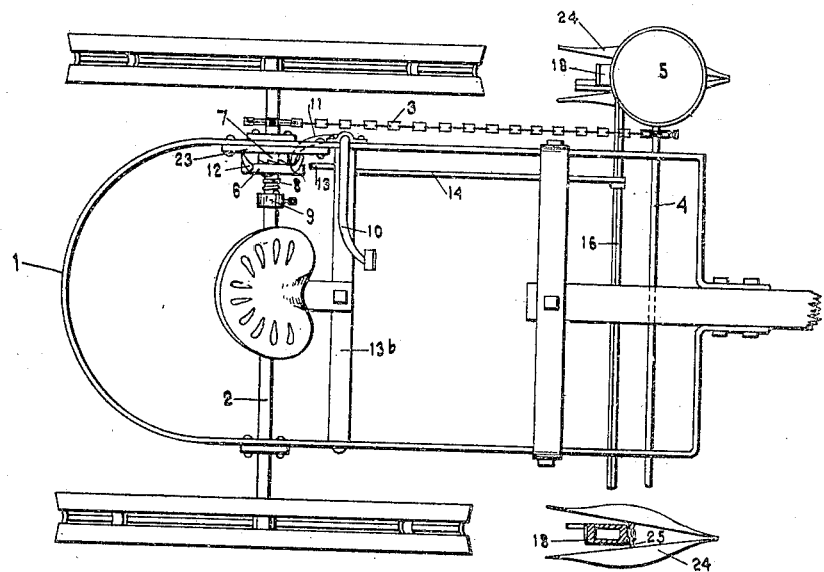
Figure 2:
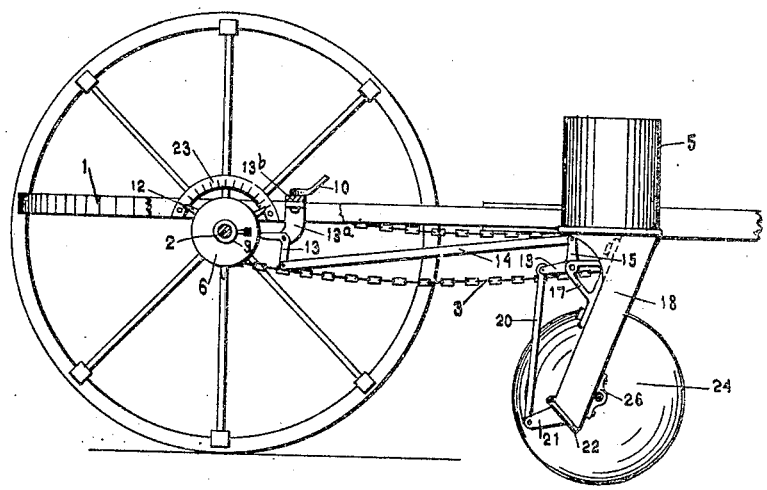
Figure 3:

With these and various other objects in view, the invention has relation to certain novel features of construction and operation, an example of which is described in the following specification and illustrated in the accompanying drawing, wherein:

Figure 1 is a top view of the planter, the upper portion of one boot, and the accompanying seed can or hopper being removed to show the disks and their means of attachment to said boot. Fig. 2 is a side view of the planter, one wheel and one disk being omitted therefrom, to make clear mechanism behind these parts. Fig. 3 is a detail view of a segmental dial, carrying units and numerals, which serve to indicate the position of the planting mechanism at the end of a row, as made clear hereinafter.

Referring now more particularly to the drawing, wherein like numerals of reference designate similar parts in all the figures, the numeral 1 denotes the frame of the planter, and 2 the axle of the same. The chain 3 transmits the rotation of the axle to a shaft 4, by which the discharging mechanism within the seed cans 5 is driven.

Numeral 6 designates a small disk or wheel, loose upon the axle 2, and provided with clutch teeth upon its outer surface. The clutch 7, fast upon the axle, is provided with lateral teeth adapted to mesh with those carried by the disk 6. A spring 8, coiled upon the axle, has one of its extremities abutting against a set collar 9, while the other extremity bears against the disk 6, normally holding the same against the clutch, in which position it must rotate. By means of foot lever 10, provided with a lower arm 11, bearing against the outer surface of disk 6, said disk may be inwardly displaced upon the axle, disengaging the clutch and preventing further rotation of the disk. A plurality of projecting, curved teeth 12, equi-distantly positioned upon the rim of the disk are adapted to contact with the upper arm of the bell-crank lever 13, which is pivoted upon a hanger 13$^a$ supported from the under surface of a cross beam 13$^b$ upon the frame. To the lower arm of the lever 13 is pivotally attached a rod 14, the other extremity of which is pivotally connected to the arm 15 rigidly mounted upon the square cross rod 16. This rod is mounted at each extremity in bearings 17 upon the boots 18. Near each extremity of the rod 16, an arm 19 is rigidly mounted thereupon. Swinging links 20 connect the arms 19 to the lugs 21, carried by the doors 22 hinged to the boots 18.

As the disk 6 rotates, the teeth 12 upon the rim thereof periodically encounter the upper, horizontal arm of the bell-crank 13, displacing the same downwardly, and thereby moving the vertical arm of the lever forwardly. This forward impulse is communicated to the arm 15 through the rod 14 and a partial rotation of rod 16 results. The outer extremities of the arms 19 are given an upward impulse by this rotation, which impulse is communicated to the lugs 21 through the links 20, thus opening the seed discharge doors of the boots.

The segmental dial 23 is attached to the frame 1 above the axle 2, in such a position that the curved teeth 12 are normally contiguous therewith. When the last hill of a row has been planted, the foot lever is operated, stopping the rotation of the disk 6, and the planter is also brought to a stop. A line is marked upon the ground indicating the position of the wheels, and the planter is then driven around to the next row and the wheels are placed upon the line previously marked. The segment of the dial is made to include an angle equal to the angle between any two of the teeth 12 upon the disk, so that one of said teeth will point to some unit upon the dial for any position of the disk. Before the new row is started, the figure upon the dial, to which one of the teeth 12 points is noted, and the disk is turned manually to bring the tooth opposite the same figure at the other side of the dial. Thus, if the tooth points to 5, at the left of the dial when the disk is thrown out of rotation, the disk will be turned so as to cause the tooth to point to the same numeral at the right of the dial. This will cause the new row of seed planted to "check" with the first row planted,—that is to say, the hills of the two rows will be in transverse alinement.

The disks 24 turn on the extremities of stationary axles 25, supported in bearings 26 attached to the part sides of the seed boots. The axles 25 are slightly curved, placing the disks of each pair at an angle with each other, and causing them to come into contact at a point close to the ground. As the planter advances, these disks are rotated by the friction of the earth, and a furrow is cut by them to receive the seed. When the seed has been discharged into this furrow, it is covered by the concave rims of the transporting wheels.

It is to be noted that the links 20 have sufficient weight to close the doors 22, after each displacement of the lever 13 by the teeth 12.

While the disk 6 is shown in the drawings as having only three projecting teeth in its rim, it is to be understood that any desired number of these may be used, the frequency of the hills in a row being increased in direct proportion with the increase of teeth upon the disk.

I am aware that changes may be made in the form and proportion of parts and details of the device herein-described and shown as the preferable embodiment of my invention without sacrificing the advantages or departing from the spirit thereof, and I therefore reserve the right to make such changes and alterations in said device as fairly come within the scope of its claims.

What I claim is:

1. In a corn or cotton planter, the combination with the frame and wheels thereof, of seed cans mounted on the frame in front of the wheels, seed boots beneath said seed cans, a disk loose upon the axle having a plurality of teeth equi-distant upon its rim, and provided with lateral clutch teeth, a clutch stationary upon the axle adapted to engage said clutch teeth upon the disk, a coiled spring upon the axle normally holding said disk against the clutch, a segmental dial, upon which the teeth on the rim of the disk are adapted to serve as pointers, a bell crank with one of whose arms the teeth of said disk are adapted to engage, a swinging link, one of whose extremities is pivotally connected to the other arm of said bell-crank, a transverse rod rotatably mounted on said frame, a rigid arm upon said rod, to which the other extremity of said swinging link is pivotally attached, rigid arms upon said rod at the extremities thereof, hinged doors upon the lower extremities of said boots, and links connecting said doors to said rigid arms.

2. In a corn or cotton planter, the combination with the frame and transporting wheels thereof, of seed cans mounted in said frame in front of each wheel, seed boots arranged beneath each can, adapted to discharge seed therefrom, a disk loose upon the axle having a plurality of teeth equi-distant upon its rim, and provided with lateral clutch teeth, a clutch stationary upon the axle adapted to engage said clutch teeth of the disk, a coiled spring upon the axle normally holding said disk against said clutch, a segmental dial arranged above said disk, upon which the teeth of the disk are adapted to indicate, a lever adapted to be operated periodically by the teeth of the disk in its rotation, and mechanism communicating the motion of said lever to doors upon the lower extremities of said boots to open the same.

In testimony whereof I have signed my name to this specification in the presence of two subscribing witnesses.

CHANCE WILKS.

Witnesses:
J. S. MURRAY,
G. B. COULSON.